United States Patent
Suzuki et al.

(10) Patent No.: US 9,157,000 B2
(45) Date of Patent: Oct. 13, 2015

(54) ACTIVE ENERGY BEAM-CURABLE INKJET INK COMPOSITION

(75) Inventors: Norio Suzuki, Tokyo (JP); Kazuhiro Jonai, Tokyo (JP); Mayuko Okamoto, Tokyo (JP); Yuji Kameyama, Tokyo (JP); Yohei Konda, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 10 days.

(21) Appl. No.: 14/008,926

(22) PCT Filed: Mar. 29, 2012

(86) PCT No.: PCT/JP2012/058449
§ 371 (c)(1),
(2), (4) Date: Oct. 23, 2013

(87) PCT Pub. No.: WO2012/133694
PCT Pub. Date: Oct. 4, 2012

(65) Prior Publication Data
US 2014/0053753 A1   Feb. 27, 2014

(30) Foreign Application Priority Data
Mar. 29, 2011   (JP) .................................. 2011-072492

(51) Int. Cl.
| C08F 2/46 | (2006.01) |
| C08G 61/04 | (2006.01) |
| C09D 11/30 | (2014.01) |
| C09D 11/101 | (2014.01) |
| C09D 11/38 | (2014.01) |

(52) U.S. Cl.
CPC .............. C09D 11/30 (2013.01); C09D 11/101 (2013.01); C09D 11/38 (2013.01)

(58) Field of Classification Search
CPC ....... C09D 11/30; C09D 11/101; C09D 11/38
USPC .................................................. 522/1; 520/1
See application file for complete search history.

(56) References Cited

U.S. PATENT DOCUMENTS

| 8,137,793 | B2 | 3/2012 | Kameyama et al. | |
| 8,507,573 | B2 | 8/2013 | Kameyama et al. | |
| 2005/0043450 | A1 | 2/2005 | Goodrich et al. | |
| 2007/0182786 | A1 | 8/2007 | Nakamura | |
| 2009/0000508 | A1 | 1/2009 | Edison et al. | |
| 2009/0197988 | A1 | 8/2009 | Kito et al. | |
| 2010/0302300 | A1 | 12/2010 | Verdonck | |
| 2010/0313782 | A1* | 12/2010 | Loccufier et al. | 101/483 |
| 2010/0331478 | A1* | 12/2010 | Claes | 524/560 |
| 2011/0069130 | A1 | 3/2011 | Loccufier et al. | |
| 2011/0124768 | A1 | 5/2011 | Claes et al. | |
| 2012/0003435 | A1 | 1/2012 | Kameyama et al. | |
| 2012/0108746 | A1 | 5/2012 | Claes | |
| 2012/0252919 | A1 | 10/2012 | Suzuki et al. | |
| 2013/0096225 | A1 | 4/2013 | Verdonck | |
| 2013/0236654 | A1 | 9/2013 | Claes et al. | |
| 2014/0050858 | A1 | 2/2014 | Loccufier et al. | |

FOREIGN PATENT DOCUMENTS

| CN | 101503588 A | 8/2009 |
| CN | 101835853 A | 9/2010 |
| EP | 2 053 100 A1 | 4/2009 |
| EP | 2 053 103 A1 | 4/2009 |
| EP | 2 402 405 A1 | 1/2012 |
| JP | 2004 042429 | 2/2004 |
| JP | 2004-067991 A | 3/2004 |
| JP | 2007 211181 | 8/2007 |
| JP | 2008 507598 | 3/2008 |
| JP | 2009 73945 | 4/2009 |
| JP | 2009 120628 | 6/2009 |
| JP | 2009-156999 A | 7/2009 |
| JP | 2009 191183 | 8/2009 |
| JP | 2011 241323 | 12/2011 |
| WO | WO 2005/019354 A1 | 3/2005 |
| WO | WO 2009/053283 A1 | 4/2009 |

OTHER PUBLICATIONS

International Search Report Issued Jun. 26, 2012 in PCT/JP12/058449 Filed Mar. 29, 2012.
Extended European Search Report issued Aug. 4, 2014 in Patent Application No. 12763533.2.
Chinese Office Action issued Jul. 2, 2014, in China Patent Application No. 2012800163510 (with English translation).
International Preliminary Report on Patentability issued Oct. 10, 2013 in PCT/JP2012/058449 filed on Mar. 29, 2012.
Written Opinion issued Jun. 26, 2012 in PCT/JP2012/058449 filed on Mar. 29, 2012.
Office Action issued Mar. 11, 2015 in Chinese Patent Application No. 2012800163510 (with English translation).

* cited by examiner

*Primary Examiner* — Ling Choi
*Assistant Examiner* — Jessica E Whiteley
(74) *Attorney, Agent, or Firm* — Oblon, McClelland, Maier & Neustadt, L.L.P.

(57) ABSTRACT

The present invention provides an ink composition for use in active energy beam-curable inkjet printing, wherein the ink composition has low viscosity yet exhibits superior curability and superior adhesion to many different substrates, and also exhibits excellent storage stability. An active energy beam-curable inkjet ink composition containing at least polymerizable monomers (A) and a stabilizer (B), and containing essentially no water, the inkjet ink composition containing, as the polymerizable monomers (A), at least a polymerizable monomer (A-1) containing a vinyl ether group and an acryloyl group, and a polymerizable monomer (A-2) containing 2 or more acryloyl groups.

6 Claims, No Drawings

ACTIVE ENERGY BEAM-CURABLE INKJET INK COMPOSITION

CROSS-REFERENCE TO RELATED APPLICATIONS

This application is a National Stage of PCT/JP2012/058449 filed on Mar. 29, 2012. This application is based upon and claims the benefit of priority to Japanese Application No. 2011-072492 filed on Mar. 29, 2011, the entire contents of which are incorporated herein by reference.

TECHNICAL FIELD

The present invention relates to an ink composition used in active energy beam-curable inkjet printing.

BACKGROUND ART

The inkjet printing method is a method in which ultra fine liquid droplets of an ink composition are adhered to a printing substrate, thereby recording images and/or text, and is characterized by not requiring the use of a plate in the printing process. The electrophotographic method is another well known printing method that does not use a plate, but in terms of apparatus cost, running costs and printing speed and the like, the inkjet printing method is considered to be superior. With the increase in demand for on-demand printing seen in recent years, the demand for inkjet printers continues to grow.

The ink compositions used in this type of inkjet printing require far more stringent control of the viscosity than the ink compositions used in offset printing or gravure printing. This is because a change in the viscosity of the ink composition causes a change in the liquid droplet volume during discharge, resulting in a change in the image quality of the printed item. Moreover, in recent years, inkjet printing systems have become widely used throughout the world, and ink compositions that suffer minimal changes in quality, and particularly viscosity, during long-term transport or storage, namely ink compositions that exhibit excellent stability over time, are now being demanded.

On the other hand, the ink compositions used in inkjet printing encompass many types of compositions, including solvent-based compositions, water-based compositions, and active energy beam-curable compositions. Among these, there has recently been a increase in the demand for active energy beam-curable inks, because they can be cured rapidly by irradiation with an active energy beam and therefore exhibit excellent printing speed, can also be applied to non-absorbent substrates such as plastic and board, and can minimize volatilized solvent volume and are therefore environmentally friendly. Particularly in the case of inkjet printing for commercial applications and industrial applications, the consideration of other additional factors, including the strength and durability of the printed product, the drying energy of the ink, and resistance to adherence of the ink components to the print head caused by ink drying, means that the use of active energy beam-curable inks is becoming increasingly widespread.

However, it is known that compared with inkjet ink compositions of other types, controlling the viscosity and the stability over time is more difficult for active energy beam-curable inkjet ink compositions. This is because the main component of an active energy beam-curable inkjet ink composition is a polymerizable monomer, and minute amounts of polymerization initiating components generated during transport or storage can cause the polymerization reaction of the polymerizable monomer to proceed.

In other words, in developing an active energy beam-curable inkjet ink composition, the important question is how to control the viscosity and stability over time, while maintaining the curability (productivity) and quality such as the adaptability to different substrates that represent the major advantages of such inks.

A multitude of previous investigations have already been undertaken with the aim of addressing the above problems. For example, Patent Document 1 is an example in which an organic solvent such as a petroleum-based solvent is added to the ink composition to improve the storage stability. However, in this example, because an organic solvent that does not participate in the polymerization reaction is added, the curability worsens. In addition, because adding an organic solvent eliminates one of the advantages of using an active energy beam-curable inkjet printing method, namely the ability to reduce the volume of volatilized solvent, this approach is undesirable. Further, Patent Document 2 is an example in which an N-vinyl lactam is used as the polymerizable monomer, and an antioxidant and a polymerization inhibitor are added in an attempt to improve the storage stability. However, the ink compositions disclosed in the specification have an extremely high content of a polymerizable monomer containing only one polymerizable reactive group (monofunctional monomer). As a result, the strength and durability of the printed item, which should be advantages of an active energy beam-curable inkjet printing method, tend to deteriorate, which is undesirable. Moreover, Patent Document 3 is an example in which, in order to improve the storage stability, a pH buffer is added to the ink composition in an attempt to improve the stability over time. However, the Good's buffer disclosed in this document is an ionic compound. As a result, depending on the storage conditions, there is a possibility that the buffer may form a different ionic compound with a material in the ink composition, thereby generating a precipitate which may appear in the inkjet head, which is also undesirable.

As described above, an ink composition that has low viscosity yet exhibits superior curability and substrate adhesion, and also has favorable storage stability has not yet been found.

PRIOR ART DOCUMENTS

Patent Documents

Patent Document 1: JP 2004-042429 A
Patent Document 2: JP 2009-120628 A
Patent Document 3: JP 2009-191183 A

SUMMARY OF THE INVENTION

The present invention provides an ink composition for use in active energy beam-curable inkjet printing, wherein the ink composition has low viscosity yet exhibits superior curability and superior adhesion to many different substrates, and also exhibits excellent storage stability.

As a result of intensive investigation aimed at providing an ink composition for use in active energy beam-curable inkjet printing which has low viscosity yet exhibits superior curability and superior adhesion to many different substrates, and also exhibits excellent storage stability, the inventors of the present invention discovered that by including 2 or more polymerizable monomers each containing 2 or more reactive sites, and also adding a stabilizer (B), the problems outlined above could be resolved, enabling them to complete the present invention.

In other words, the present invention relates to aspects (1) to (4) described below.

(1) An active energy beam-curable inkjet ink composition comprising at least polymerizable monomers (A) and a stabilizer (B), and comprising essentially no water, the inkjet ink composition comprising, as the polymerizable monomers (A), 2 or more polymerizable monomers each containing 2 or more reactive sites.

(2) The active energy beam-curable inkjet ink composition according to (1), the inkjet ink composition comprising, as the stabilizer (B), a hindered phenol-based compound (B-1) and a compound (B-2) selected from among phenothiazine-based compounds, hindered amine-based compounds and phosphorus-based compounds.

(3) The active energy beam-curable inkjet ink composition according to (1) or (2), the inkjet ink composition comprising, as the polymerizable monomer containing 2 or more reactive sites, at least one of 2-(2-vinyloxyethoxy)ethyl acrylate, 1,9-nonanediol diacrylate, and dipropylene glycol diacrylate.

(4) The active energy beam-curable inkjet ink composition according to any one of (1) to (3), the inkjet ink composition comprising, as the compound (B-2) selected from among phenothiazine-based compounds, hindered amine-based compounds and phosphorus-based compounds, a compound (B-2-1) selected from among phenothiazine-based compounds and hindered amine-based compounds, and a phosphorus-based compound (B-2-2).

By including 2 or more polymerizable monomers each containing 2 or more reactive sites, and also adding the stabilizer (B), an ink composition for use in active energy beam-curable inkjet printing which has low viscosity yet has superior curability and superior adhesion to many different substrates, and also exhibits excellent storage stability was able to be obtained.

This Application is related to the subject matter disclosed in prior Japanese Application 2011-072492 filed on Mar. 29, 2011, the entire contents of which are incorporated herein as reference.

EMBODIMENTS FOR CARRYING OUT THE INVENTION

The embodiments of the present invention are able to obtain ink compositions which have low viscosity yet have superior curability and superior adhesion to many different substrates, and also exhibit excellent storage stability, by combining 2 or more polymerizable monomers each containing 2 or more reactive sites and the stabilizer (B). For example, the polymerizable monomers containing 2 or more reactive sites are preferably 2 or more monomers selected from the group consisting of polymerizable monomers (A-1) containing a vinyl ether group and an acryloyl group, and polymerizable monomers (A-2) containing 2 or more acryloyl groups.

Among polymerizable monomers, those having a larger amount of polymerizable reactive groups relative to the molecular weight (hereafter referred to as the "reactive group equivalent weight") generally exhibit higher reactivity, and are known to exhibit excellent curability even in the presence of a very small amount of radicals that act as a trigger for the polymerization reaction. Consequently, when comparing polymerizable monomers having similar structures, monomers having a greater number of polymerizable reactive groups within a single molecule, namely polyfunctional monomers, have a superior reactive group equivalent weight, and therefore exhibit improved curability. Further, an acryloyl group, methacryloyl group, and vinyl group and the like are known polymerizable reactive groups, and among these, the acryloyl group is known to exhibit the most favorable reactivity. Accordingly, in order to enhance the reactivity of the ink composition, the polymerizable monomer (A-2) containing 2 or more acryloyl groups is preferable.

However, on the other hand, in the polymerizable monomer (A-2) containing 2 or more acryloyl groups, the viscosity may sometimes increase due to intermolecular interactions caused by the acryloyl groups. Depending on the formulation, the viscosity of the ink composition may exceed 100 mPa·s, making the composition unusable as an inkjet ink composition.

In the present embodiment, in order to address this problem, another polymerizable monomer containing 2 or more reactive sites is preferably used in combination with the polymerizable monomer (A-2). For example, (A-1) which represents an example of this other polymerizable monomer is characterized by having an extremely low viscosity of 10 mPa·s or less, despite being a polyfunctional monomer. As a result, even if the polymerizable monomer (A-2) which contains 2 or more acryloyl groups and has a high viscosity is used, by combining this monomer with the polymerizable monomer (A-1) containing a vinyl ether group and an acryloyl group, any increase in the viscosity of the ink composition can be suppressed, and as a result, an ink composition which exhibits excellent curability while retaining superior inkjet compatibility can be obtained.

However, with just this combination, any minute amount of radicals generated in the composition will cause the polymerization reaction to proceed, meaning there is a possibility that the ink composition may suffer an increase in viscosity or gelling during storage.

In the present embodiment, in order to address this problem, the stabilizer (B) is also added. Conventionally known materials can be used as the stabilizer (B), but the use of a combination of a hindered phenol-based compound (B-1) and a compound (B-2) selected from among phenothiazine-based compounds, hindered amine-based compounds and phosphorus-based compounds is preferable. Further, for the compound (B-2) selected from among phenothiazine-based compounds, hindered amine-based compounds and phosphorus-based compounds, the use of a combination of a compound (B-2-1) selected from among phenothiazine-based compounds and hindered amine-based compounds, and a phosphorus-based compound (B-2-2) is particularly preferable. The fact that using these combinations of stabilizers enables a dramatic improvement in the stability over time while maintaining good curability represents a finding of the present invention. Although the reasons are not entirely clear, it is thought that when the materials described above are used in combination, an interaction occurs between the materials, yielding a much greater effect than that observed when either of the materials is used alone, and because the amounts required of the materials are small, the effect on the polymerization reaction when the ink is irradiated with an active energy beam can be suppressed to a minimum.

As described above, in order to resolve the above problems, the polymerizable monomers containing 2 or more reactive sites and the stabilizer (B) are used in combination. The blend ratio between the materials can be adjusted so that excellent curability, adhesion and stability over time can be achieved regardless of the printing conditions or the ink composition storage conditions.

The ratio of the blend amount of the polymerizable monomer (A-1) containing a vinyl ether group and an acryloyl group relative to the blend amount of the polymerizable monomer (A-2) containing 2 or more acryloyl groups is preferably 25% by weight or more but 400% by weight or less, and is particularly preferably 50% by weight or more but 200% by weight or less (hereafter, unless specified otherwise, "%" in the present description refers to "% by weight"). When the ratio of the blend amount of the polymerizable monomer (A-1) containing a vinyl ether group and an acryloyl group relative to the blend amount of the polymerizable monomer (A-2) containing 2 or more acryloyl groups is 25% or more, the effect of the polymerizable monomer (A-1) containing a vinyl ether group and an acryloyl group is adequate, meaning the viscosity of the ink composition is prevented from increasing too much, the inkjet compatibility is good, and the curability and adhesion are also favorable. When the ratio is 400% or less, the adhesion and the stability over time are favorable.

The blend amount of the stabilizer (B) may also be set with due consideration of the blend amounts of the polymerizable monomers (A) for which the polymerization reactions require suppression. The blend amount of the stabilizer (B) relative to the total weight of the polymerizable monomers (A) is preferably 0.1% or more but 2% or less, and is particularly preferably 0.5% or more but 1.5% or less. When the blend amount is within this range, the interaction mentioned above is satisfactory, and a good balance is achieved between the stability over time and the curability.

A specific example of the polymerizable monomer (A-1) containing a vinyl ether group and an acryloyl group is the product VEEA manufactured by Nippon Shokubai Co., Ltd.

The blend amount of the polymerizable monomer (A-1) containing a vinyl ether group and an acryloyl group relative to the total weight of the polymerizable monomers (A) is preferably at least 33.4%, is more preferably 35% or more but 80% or less, and is particularly preferably 40% or more but 60% or less. When this amount is at least 33.4%, the viscosity of the ink composition is prevented from becoming too high, and the curability and adhesion are favorable. As described above, the blend amount of the polymerizable monomer (A-1) containing a vinyl ether group and an acryloyl group can be set with due consideration of the blend amounts of the polymerizable monomer (A-2) containing 2 or more acryloyl groups and the stabilizer (B).

Conventionally known materials can be used, as necessary, as the polymerizable monomer (A-2) containing 2 or more acryloyl groups. Specific examples include dimethyloltricyclodecane diacrylate, (ethoxylated (or propoxylated)) bisphenol A diacrylate, cyclohexanedimethanol diacrylate, ethylene glycol diacrylate, (ethoxylated (or propoxylated)) 1,6-hexanediol diacrylate, 1,9-nonanediol diacrylate, 1,10-decanediol diacrylate, ethoxylated (or propoxylated) neopentyl glycol diacrylate, neopentyl glycol hydroxypivalate diacrylate, dipropylene glycol diacrylate, (neopentyl glycol-modified) trimethylolpropane diacrylate, tripropylene glycol diacrylate, dicyclopentanyl diacrylate, pentaerythritol tri- (or tetra-) acrylate, trimethylolpropane tri- (or tetra-) acrylate, tetramethylolmethane tri- (or tetra-) acrylate, and dipentaerythritol hexaacrylate. The above materials may be used individually, or a combination of 2 or more materials may be used.

Among these materials, the selection of dimethyloltricyclodecane diacrylate, ethoxylated (or propoxylated) neopentyl glycol diacrylate, neopentyl glycol hydroxypivalate diacrylate, 1,6-hexanediol diacrylate, 1,9-nonanediol diacrylate, 1,10-decanediol diacrylate, dipropylene glycol diacrylate, tripropylene glycol diacrylate or trimethylolpropane triacrylate is preferable, but in terms of achieving low viscosity yet excellent curability and adhesion, the selection of 1,9-nonanediol diacrylate is particularly preferable.

The blend amount of the polymerizable monomer (A-2) containing 2 or more acryloyl groups relative to the total weight of the polymerizable monomers (A) is preferably less than 66.6%, and is more preferably 20% or more but 65% or less. When this blend amount is less than 66.6%, the viscosity of the ink composition is prevented from becoming too high, and the inkjet compatibility is favorable. As described above, the blend amount of the polymerizable monomer (A-2) containing 2 or more acryloyl groups can be set with due consideration of the blend amounts of the polymerizable monomer (A-1) containing a vinyl ether group and an acryloyl group and the stabilizer (B).

Conventionally known materials can be used, as necessary, as the stabilizer (B), but in terms of achieving the anticipated interaction, the aforementioned hindered phenol-based compounds, phenothiazine-based compounds, hindered amine-based compounds and phosphorus-based compounds can be used particularly favorably. Examples of the hindered phenol-based compounds include the products "IRGANOX 1010, 1010FF, 1035, 1035FF, 1076, 1076FD, 1076DWJ, 1098, 1135, 1330, 245, 245FF, 245DWJ, 259, 3114, 565, 565DD and 295" manufactured by BASF Corporation, the products "BHT SWANOX", "NONFLEX Alba, MBP, EBP, CBP and BB", and "TBH" manufactured by Seiko Chemical Corporation, the products "AO-20, 30, 50, 50F, 70, 80 and 330" manufactured by ADEKA Corporation, the product "H-BHT" manufactured by Honshu Chemical Industry Co., Ltd., and the products "YOSHINOX BB, 425 and 930" manufactured by API Corporation. Specific examples of the phenothiazine-based compounds include "phenothiazine" manufactured by Seiko Chemical Corporation, and "phenothiazine", "2-methoxyphenothiazine" and "2-cyanophenothiazine" manufactured by Sakai Chemical Industry Co., Ltd., whereas examples of the hindered amine-based compounds include the products "IRGANOX 5067" and "TINUVIN 144, 765, 770DF and 622LD" manufactured by BASF Corporation, the products "NONFLEX H, F, OD-3, DCD and LAS-P", "STEARER STAR", "diphenylamine", "4-aminodiphenylamine" and "4-oxydiphenylamine" manufactured by Seiko Chemical Corporation, the product "HO-TEMPO" manufactured by Evonik Degussa GmbH, and the products "FANCRYL 711MM and 712HM" manufactured by Hitachi Chemical Co., Ltd. Examples of the phosphorus-based compounds include "triphenylphosphine" and the products "IRGAFOS 168 and 168FF" manufactured by BASF Corporation, and the product "NONFLEX TNP" manufactured by Seiko Chemical Corporation, whereas examples of other compounds include the products "IRGASTAB UV-10 and 22" manufactured by BASF Corporation, "hydroquinone", "methoquinone", "toluquinone", "MH", "PBQ", "TBQ" and "2,5-diphenyl-p-benzoquinone" manufactured by Seiko Chemical Corporation, the products "Q-1300 and 1301" manufactured by Wako Pure Chemical Industries, Ltd., and the products "GENORAD 16, 18 and 20" manufactured by RAHN AG. Among these compounds, in terms of solubility in the polymerizable monomers (A), and the color of the stabilizer itself, the hindered phenol-based compound is preferably one of the products "BHT SWANOX" or "NONFLEX Alba" manufactured by Seiko Chemical Corporation or the product "H-BHT" manufactured by Honshu Chemical Industry Co., Ltd., the phenothiazine-based compound is preferably "phenothiazine" manufactured by Seiko Chemical Corporation or "phenothiazine"

manufactured by Sakai Chemical Industry Co., Ltd., the hindered amine-based compound is preferably the product "HO-TEMPO" manufactured by Evonik Degussa GmbH, and the phosphorus-based compound is preferably "triphenylphosphine" manufactured by BASF Corporation.

As mentioned above, it is necessary to set the blend amount of the stabilizer (B) with due consideration of the blend amounts of the polymerizable monomers (A). Further, when stabilizer materials (B) are combined, the blend amount of the stabilizer (B) can be determined with due consideration of the blend ratio between each of the materials. The ratio of the blend amount of the compound (B-2) selected from among phenothiazine-based compounds, hindered amine-based compounds and phosphorus-based compounds, relative to the blend amount of the hindered phenol-based compound (B-1) is preferably 5% or more but 25% or less, and is particularly preferably 10% or more but 20% or less. Further, when a combination of the compound (B-2-1) selected from among phenothiazine-based compounds and hindered amine-based compounds and the phosphorus-based compound (B-2-2) is used as the compound (B-2) selected from among phenothiazine-based compounds, hindered amine-based compounds and phosphorus-based compounds, the ratio of the blend amount of the phosphorus-based compound (B-2-2) relative to the blend amount of the compound (B-2-1) selected from among phenothiazine-based compounds and hindered amine-based compounds is preferably 5% or more but 100% or less, and is particularly preferably 10% or more but 50% or less. When these ranges are satisfied, the aforementioned interaction between the stabilizers can be utilized effectively, resulting in a favorable balance between the stability over time and the curability.

Where necessary, conventionally known materials can be used as polymerizable monomers (A) other than the polymerizable monomers containing 2 or more reactive sites.

Specific examples of monofunctional monomers include benzyl (meth)acrylate, (ethoxylated (or propoxylated)) 2-phenoxyethyl (meth)acrylate, dicyclopentenyl(oxyethyl) (meth)acrylate, phenoxydiethylene glycol (meth)acrylate, 2-methoxyethyl (meth)acrylate, methoxytriethylene glycol (meth)acrylate, 2-ethoxyethyl (meth)acrylate, ethoxyethoxyethyl (meth)acrylate, methoxydipropylene glycol (meth)acrylate, dipropylene glycol (meth)acrylate, β-carboxylethyl (meth)acrylate, trimethylolpropane formal (meth)acrylate, isoamyl (meth)acrylate, cyclohexyl (meth)acrylate, tetrahydrofurfuryl (meth)acrylate, isobornyl (meth)acrylate, dicyclopentanyl (meth)acrylate, isooctyl (meth)acrylate, lauryl (meth)acrylate, 2-hydroxy-3-phenoxypropyl (meth)acrylate, 1,4-cyclohexanedimethanol (meth)acrylate, 2-hydroxyethyl (meth)acrylate, 2-hydroxypropyl (meth)acrylate, 4-hydroxybutyl (meth)acrylate, acryloylmorpholine, N-vinylcaprolactam, N-vinylpyrrolidone, N-vinylformamide, and N-acryloyloxyethyl hexahydrophthalimide.

Further, among polyfunctional monomers, examples of monomers containing a plurality of methacryloyl groups include dimethyloltricyclodecane dimethacrylate, (ethoxylated (or propoxylated)) bisphenol A dimethacrylate, cyclohexanedimethanol dimethacrylate, (poly)ethylene glycol dimethacrylate, (ethoxylated (or propoxylated)) 1,6-hexanediol dimethacrylate, ethoxylated (or propoxylated) neopentyl glycol dimethacrylate, neopentyl glycol hydroxypivalate dimethacrylate, dipropylene glycol dimethacrylate, (neopentyl glycol-modified) trimethylolpropane dimethacrylate, tripropylene glycol dimethacrylate, dicyclopentanyl dimethacrylate, pentaerythritol tri- (or tetra-) methacrylate, trimethylolpropane tri- (or tetra-) methacrylate, and tetramethylolmethane tri- (or tetra-) methacrylate. Moreover, examples of monomers containing a plurality of vinyl groups include butanediol divinyl ether, diethylene glycol divinyl ether, triethylene glycol divinyl ether, cyclohexanedimethanol divinyl ether, trimethylolpropane divinyl ether, pentaerythritol tri- (or tetra-) vinyl ether, trimethylolpropane diallyl ether, and pentaerythritol tri- (or tetra-) allyl ether.

Among these, in terms of the viscosity and reactivity, selection of a monofunctional monomer is preferable, and selection of (ethoxylated (or propoxylated)) 2-phenoxyethyl acrylate, ethoxyethoxyethyl acrylate, isobornyl acrylate, isooctyl acrylate, lauryl acrylate, N-vinylcaprolactam, or N-acryloyloxyethyl hexahydrophthalimide is particularly preferable.

When a monofunctional monomer is used, the blend amount of the monofunctional monomer relative to the total weight of the polymerizable monomers (A) is preferably from 10 to 50%, and more preferably from 20 to 40%.

An oligomer or prepolymer may be used in the ink composition to impart durability to the printed item. Specific examples of the oligomer or prepolymer include products manufactured by Daicel UCB Co., Ltd., such as "EBECRYL 230, 244, 245, 270, 280/151B, 284, 285, 4830, 4835, 4858, 4883, 8402, 8803, 8800, 254, 264, 265, 294/35HD, 1259, 1264, 4866, 9260, 8210, 1290, 1290K, 5129, 2000, 2001, 2002, 2100, KRM7222, KRM7735, 4842, 210, 215, 4827, 4849, 6700, 6700-20T, 204, 205, 6602, 220, 4450, 770, IRR567, 81, 84, 83, 80, 657, 800, 805, 808, 810, 812, 1657, 1810, IRR302, 450, 670, 830, 835, 870, 1830, 1870, 2870, IRR267, 813, IRR483, 811, 436, 438, 446, 505, 524, 525, 554W, 584, 586, 745, 767, 1701, 1755, 740/40TP, 600, 601, 604, 605, 607, 608, 609, 600/25TO, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 3700-20H, 3700-20T, 3700-25R, 3701, 3701-20T, 3703, 3702, RDX63182, 6040, and IRR419", products manufactured by Sartomer Company Inc., such as "CN104, CN120, CN124, CN136, CN151, CN2270, CN2271E, CN435, CN454, CN970, CN971, CN972, CN9782, CN981, CN9893, and CN991", products manufactured by BASF Corporation, such as "LAROMER EA81, LR8713, LR8765, LR8986, PE56F, PE44F, LR8800, PE46T, LR8907, PO43F, PO77F, PE55F, LR8967, LR8981, LR8982, LR8992, LR9004, LR8956, LR8985, LR8987, UP35D, UA19T, LR9005, PO83F, PO33F, PO84F, PO94F, LR8863, LR8869, LR8889, LR8997, LR8996, LR9013, LR9019, PO9026V, and PE9027V", products manufactured by Cognis, such as "PHOTOMER 3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572, and 3660", products manufactured by Negami Chemical Industrial Co., Ltd., such as "Art-Resin UN-9000HP, 9000PEP, 9200A, 7600, 5200, 1003, 1255, 3320HA, 3320HB, 3320HC, 3320HS, 901T, 1200TPK, 6060PTM, and 6060P", products manufactured by The Nippon Synthetic Chemical Industry Co., Ltd., such as "SHIKOH UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA, and 2750B", and products manufactured by Nippon Kayaku Co., Ltd., such as "KAYARAD R-280, R-146, R131, R-205, EX2320, R190, R130, R-300, C-0011, TCR-1234, ZFR-1122, UX-2201, UX-2301, UX3204, UX-3301, UX-4101, UX-6101, UX-7101, MAX-5101, MAX-5100, MAX-3510, and UX-4101".

An organic solvent may be included in the ink composition to reduce the viscosity and improve the wet spreadability of the ink on the substrate.

Examples of the organic solvent include glycol monocarboxylates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, and dipropylene glycol monomethyl ether butyrate; glycol dicarboxylates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol dibutyrate, diethylene glycol acetate propionate, diethylene glycol acetate butyrate, diethylene glycol propionate butyrate, diethylene glycol dipropionate, diethylene glycol dibutyrate, propylene glycol acetate propionate, propylene glycol acetate butyrate, propylene glycol propionate butyrate, propylene glycol dipropionate, propylene glycol dibutyrate, dipropylene glycol acetate propionate, dipropylene glycol acetate butyrate, dipropylene glycol propionate butyrate, dipropylene glycol dipropionate, and dipropylene glycol dibutyrate; glycols such as ethylene glycol, diethylene glycol, triethylene glycol, propylene glycol, and dipropylene glycol; glycol ethers such as diethyl diglycol, diethylene glycol dialkyl ethers, tetraethylene glycol dialkyl ethers, ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, and tripropylene glycol monomethyl ether; and lactate esters such as methyl lactate, ethyl lactate, propyl lactate and butyl lactate. Among these, tetraethylene glycol dialkyl ether, ethylene glycol monobutyl ether acetate, and diethyl diglycol are preferable.

The ink composition of the present embodiment contains essentially no water. In other words, a non-aqueous ink. The amount of water in the ink composition is preferably 5% by weight or less.

The photoradical polymerization initiator included in the ink composition can be selected freely in accordance with the curing rate, the properties of the cured coating film, and the colorant material. Among the various possibilities, a molecular cleavage polymerization initiator or a hydrogen abstraction polymerization initiator is preferable, and specific examples of compounds that can be used favorably include benzoin isobutyl ether, 2,4-diethylthioxanthone, 2-isopropylthioxanthone, 2,4,6-trimethylbenzoyl diphenylphosphine oxide, 2-benzyl-2-dimethylamino-1-(4-morpholinophenyl)-butan-1-one, bis(2,6-dimethoxybenzoyl)-2,4,4-trimethylpentylphosphine oxide, bis(2,4,6-trimethylbenzoyl)-phenylphosphine oxide, 2-methyl-1-(4-methylthiophenyl)-2-morpholinopropan-1-one, oligo(2-hydroxy-2-methyl-1-(4-(1-methylvinyl)phenyl)propanone), 4-benzoyl-4'-methyl-diphenyl sulfide, 1,2-octanedione, and 1-(4-(phenylthio)-2,2-(O-benzoyloxime). These photoradical polymerization initiators are preferable in terms of the fact that the radical generation reaction is not impaired by light absorption by magnetic powders or the polymerizable compounds, and the fact that the radical generation efficiency is high, meaning the curability of the ink composition can be improved.

Examples of other photoradical polymerization initiators besides those described above include molecular cleavage polymerization initiators such as 1-hydroxycyclohexyl phenyl ketone, benzoin ethyl ether, benzyl dimethyl ketal, 2-hydroxy-2-methyl-1-phenylpropan-1-one and 1-(4-isopropylphenyl)-2-hydroxy-2-methylpropan-1-one, and hydrogen abstraction polymerization initiators such as benzophenone, 4-phenylbenzophenone and isophthalphenone.

The photoradical polymerization initiator may be either a single compound or a combination of 2 or more compounds selected with due consideration of the wavelength spectrum of the active energy beam and the light absorption spectrum of the photoradical polymerization initiator(s).

Further, a sensitizer may be used in combination with the above photoradical polymerization initiator, and examples of the sensitizer include amines that do not undergo an addition reaction with the aforementioned polymerizable compounds, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone. Of course, it is preferable that the photoradical polymerization initiator and the sensitizer exhibit excellent solubility in the ink composition, and do not impair the ultraviolet transmittance of the composition.

The photoradical polymerization initiator is preferably added in an amount of 2 to 25% by weight relative to the polymerizable compounds. When the amount is at least 2% by weight, the curing rate is favorable, and when the amount is 25% by weight or less, the composition is economically viable, and no undissolved residues are generated. In those cases where undissolved residues are generated, even if heat is applied to dissolve the residues, the viscosity of the ink composition tends to increase, and as a result, the viscosity of the ink composition cannot be maintained within the preferred range described above, and discharge problems tend to occur.

In those cases where a colorant is added to the ink composition, a dye or a pigment may be used, but a pigment can be used more favorably from the viewpoint of the durability of the printed item. The types of pigments used in ink compositions designed for general-purpose printing applications or coating material applications can be used, and the pigment may be selected in accordance with the coloring properties and the light resistance properties required. Examples of pigments that can be used include achromatic pigments such as carbon blacks, titanium oxide and calcium carbonate, and chromatic organic pigments. Examples of the organic pigments include insoluble azo pigments such as toluidine red, toluidine maroon, Hansa yellow, benzidine yellow and pyrazolone red, soluble azo pigments such as lithol red, helio bordeaux, pigment scarlet and permanent red 2B, derivatives of vat dyes such as alizarine, indanthrone and thioindigo maroon, phthalocyanine-based organic pigments such as phthalocyanine blue and phthalocyanine green, quinacridone-based organic pigments such a quinacridone red and quinacridone magenta, perylene-based organic pigments such as perylene red and perylene scarlet, isoindolinone-based organic pigments such as isoindolinone yellow and isoindolinone orange, pyranthrone-based organic pigments such as pyranthrone red and pyranthrone orange, thioindigo-based organic pigments, condensed azo-based organic pigments, benzimidazolone-based organic pigments, quinophthalone-based organic pigments such as quinophthalone yellow, isoindoline-based organic pigments such as isoindoline yellow, naphthol-based organic pigments, and other pigments such as flavanthrone yellow, acylamide yellow, nickel azo yellow, copper azo methine yellow, perinone orange, anthrone orange, dianthraquinonyl red, and dioxazine violet.

Examples of the organic pigments in terms of their color index (C.I.) numbers include C.I. pigment yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180 and 185, C.I. pigment orange 16, 36, 43, 51, 55, 59 and 61, C.I. pigment red 9, 48, 49, 52, 53, 57, 97, 122, 123, 149, 168, 177, 180, 185, 192, 202, 206, 215, 216, 217, 220, 223, 224, 226, 227, 228, 238, 240 and 269, C.I. pigment violet 19, 23, 29, 30, 37, 40 and 50, C.I. pigment blue 15, 15:1, 15:3, 15:4, 15:6, 22, 60 and 64, C.I. pigment green 7 and 36, and C.I. pigment brown 23, 25 and 26.

Specific examples of the carbon blacks include products manufactured by Degussa AG, such as "Special Black 350, 250, 100, 550, 5, 4, 4A and 6", and "Printex U, V, 140U, 140V, 95, 90, 85, 80, 75, 55, 45, 40, P, 60, L6, L, 300, 30, 3, 35, 25, A and G", products manufactured by Cabot Corporation, such as "REGAL 400R, 660R, 330R and 250R", and "MOGUL E and L", and products manufactured by Mitsubishi Chemical Corporation, such as "MA 7, 8, 11, 77, 100, 100R, 100S, 220 and 230", and "#2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, CF9, #95 and #260".

Specific examples of the titanium oxide include products manufactured by Ishihara Sangyo Kaisha, Ltd., such as "TIPAQUE CR-50, 50-2, 57, 80, 90, 93, 95, 953, 97, 60, 60-2, 63, 67, 58, 58-2, and 85", "TIPAQUE R-820, 830, 930, 550, 630, 680, 670, 580, 780, 780-2, 850 and 855", "TIPAQUE A-100 and 220", "TIPAQUE W-10", "TIPAQUE PF-740 and 744", "TTO-55(A), 55(B), 55(C), 55(D), 55(S), 55(N), 51(A) and 51(C)", "TTO-S-1 and 2" and "TTO-M-1 and 2", products manufactured by Tayca Corporation, such as "TITANIX JR-301, 403, 405, 600A, 605, 600E, 603, 805, 806, 701, 800 and 808" and "TITANIX JA-1, C, 3, 4 and 5", and products manufactured by DuPont Corporation, such as "Ti-Pure R-900, 902, 960, 706 and 931".

Of the above pigments, quinacridone-based organic pigments, phthalocyanine-based organic pigments, benzimidazolone-based organic pigments, isoindolinone-based organic pigments, condensed azo-based organic pigments, quinophthalone-based organic pigments and isoindoline-based organic pigments and the like exhibit superior light resistance, and are therefore preferred. The organic pigment is preferably a finely powdered pigment having an average particle size of 10 to 200 nm as measured by laser scattering. When the average particle size of the pigment is 10 nm or larger, the particle size is prevented from becoming overly small, meaning no reduction in light resistance occurs. When the average particle size is 200 nm or less, dispersion of the pigment can be maintained in a stable manner, and precipitation of the pigment does not occur.

Micronization of the organic pigment can be performed, for example, using the method described below. In other words, a mixture containing at least three components, namely the organic pigment, a water-soluble inorganic salt in an amount equivalent to 3 or more times the weight of the organic pigment, and a water-soluble solvent, is prepared as a clay-like mixture, and following vigorous kneading of the mixture with a kneader or the like to micronize the components, the kneaded product is added to water and stirred with a high-speed mixer or the like to produce a slurry. Subsequently, filtration and water washing of the slurry are repeated to remove the water-soluble inorganic salt and the water-soluble solvent. During the micronization process, a resin or a pigment dispersant or the like may be added to the mixture.

Examples of the water-soluble inorganic salt include sodium chloride and potassium chloride. These inorganic salts are used in an amount in the range of 3 or more times, and preferably 20 or less times, the weight of the organic pigment. When the amount of the inorganic salt is at least 3 times the weight of the organic pigment, a treated pigment having the desired size can be obtained. Further, when the amount is 20 or less times the weight of the organic pigment, the subsequently performed washing treatment is easier, and the actual amount of the organic pigment treated can be increased.

The water-soluble solvent is used to ensure an appropriate clay-like state for the mixture of the organic pigment and the water-soluble inorganic salt that is used as a pulverization aid, and to ensure that sufficient pulverization is performed efficiently. There are no particular limitations on the solvent provided it is soluble in water, but because the temperature of the mixture increases during kneading, generating a state in which the solvent is easily evaporated, a solvent having a high boiling point such as a boiling point of 120 to 250° C. is preferred in terms of safety. Examples of the water-soluble solvent include 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and low molecular weight polypropylene glycol.

In order to obtain satisfactory concentration and satisfactory light resistance, the pigment is preferably included in the ink composition in an amount within a range from 0.1 to 30% by weight.

A pigment dispersant is preferably added to the ink composition in order to improve the dispersibility of the pigment and the storage stability of the ink composition. Examples of pigment dispersants that can be used include hydroxyl group-containing carboxylate esters, salts of long-chain polyaminoamides and high molecular weight acid esters, salts of high molecular weight polycarboxylic acids, salts of long-chain polyaminoamides and polar acid esters, high molecular weight unsaturated acid esters, high molecular weight copolymers, modified polyurethanes, modified polyacrylates, polyetherester type anionic surfactants, salts of naphthalenesulfonic acid-formalin condensation products, salts of aromatic sulfonic acid-formalin condensation products, polyoxyethylene alkyl phosphate esters, polyoxyethylene nonylphenyl ether, and stearylamine acetate.

Specific examples of the dispersant include products manufactured by BYK Chemie, such as "Anti-Terra-U (a polyaminoamide phosphate)", "Anti-Terra-203/204 (salts of high molecular weight polycarboxylic acids)", "DISPER-BYK-101 (a polyaminoamide phosphate and an acid ester), 107 (a hydroxyl group-containing carboxylate ester), 110 and 111 (copolymers that contain acid groups), 130 (a polyamide), 161, 162, 163, 164, 165, 166 and 170 (high molecular weight copolymers)", "400", "BYKUMEN" (a high molecular weight unsaturated acid ester), "BYK-P104, P105 (high molecular weight unsaturated polycarboxylic acids", "P104S, 240S (systems containing a high molecular weight unsaturated polycarboxylic acid and silicon)", and "LACTI-MON (a combination of a long-chain amine, an unsaturated polycarboxylic acid, and silicon)".

Other examples include products manufactured by Efka Chemicals, such as "Efka 44, 46, 47, 48, 49, 54, 63, 64, 65, 66, 71, 701, 764 and 766", "Efka Polymer 100 (a modified polyacrylate), 150 (an aliphatic modified polymer), 400, 401, 402, 403, 450, 451, 452 and 453 (modified polyacrylates) and 745 (a copper phthalocyanine system)", products manufactured by Kyoeisha Chemical Co., Ltd., such as "FLOWLEN TG-710 (a urethane oligomer)", "FLOWNON SH-290 and SP-1000", and "POLYFLOW No. 50E and No. 300 (acrylic copolymers)", and products manufactured by Kusumoto Chemicals Ltd., such as "DISPARLON KS-860, 873SN and 874 (high molecular weight dispersants), #2150 (an aliphatic polyvalent carboxylic acid), and #7004 (a polyether ester type dispersant)".

Further examples include products manufactured by Kao Corporation, such as "DEMOL RN and N (sodium salts of naphthalenesulfonic acid-formalin condensates), MS, C and SN-B (sodium salts of aromatic sulfonic acid-formalin condensates), and EP", "HOMOGENOL L-18 (a polycarboxylic acid type polymer)", "EMULGEN 920, 930, 931, 935, 950 and 985 (polyoxyethylene nonylphenyl ethers)", and "ACETAMIN 24 (a coconut amine acetate) and 86 (stearylamine acetate)", products manufactured by The Lubrizol Corporation, such as "Solsperse 5000 (a phthalocyanine ammonium salt system), 13940 (a polyesteramine system), 17000 (a fatty acid amine system), and 24000GR, 32000, 33000, 35000, 39000, 41000 and 53000", products manufactured by Nikko Chemicals Co., Ltd., such as "NIKKOL T106 (a polyoxyethylene sorbitan monooleate), MYS-IEX (a polyoxyethylene monostearate), and Hexagline 4-0 (a hexaglyceryl tetraoleate)", products manufactured by Ajinomoto Fine Techno Co., Inc., such as "AJISPER PB821, 822, 824, 827 and 711", and products manufactured by Tego Chemie Service GmbH, such as "Tego Disper 685".

The dispersant is preferably included in the ink composition in an amount of 0.01 to 10% by weight.

In order to further enhance the dispersibility of the pigment and the storage stability of the ink composition, an acidic derivative of an organic pigment is preferably added to the ink composition when the pigment is being dispersed.

When a colorant is incorporated within the ink composition, it is preferable to thoroughly disperse the polymerizable monomers, the pigment dispersant, the pigment, and any additives in advance using a typical dispersion device such as a sand mill, thereby preparing a liquid concentrate containing the pigment at high concentration, and then diluting the liquid concentrate with the remainder of the polymerizable monomers. With this method, satisfactory dispersion can be achieved even in a dispersion process using a typical dispersion device, and because excessive dispersion energy is not applied and an excessively long dispersion time is not required, an ink composition having excellent stability can be produced without causing degradation of the raw materials during the dispersion process.

Additives such as surface modifiers, leveling agents, ultraviolet absorbers and antioxidants may also be used in the ink composition, as necessary, to improve the printability and the durability of the printed item.

When the ink composition is to contain the polymerizable monomers (A), the stabilizer (B), the photopolymerization initiator, additives and a colorant, the ink composition is produced by combining and mixing the pigment liquid concentrate described above, and then dissolving the photopolymerization initiator in the pigment liquid concentrate. At this time, in order to prevent clogging at the head, it is preferable to filter the ink composition, following dissolution of the photopolymerization initiator, through a filter having a pore size of 3 μm or less, and preferably a pore size of 1 μm or less.

The ink composition is prepared so that the viscosity at 25° C. is preferably adjusted to 5 to 50 mPa·s, more preferably to 5 to 30 mPa·s, and particularly preferably to 5 to 15 mPa·s. In this viscosity region, the ink composition exhibits stable discharge properties in heads ranging from heads having a typical frequency of 5 to 30 kHz, through to heads having a high frequency of 10 to 50 kHz. If the viscosity is less than 5 mPa·s, then the conformity with discharge from a high frequency head tends to deteriorate, whereas if the viscosity exceeds 50 mPa·s, then there is a deterioration in the discharge itself, even if a viscosity-reduction mechanism that uses heating is incorporated within the head, and the stability of the discharge becomes unsatisfactory, eventually leading to complete discharge failure.

Furthermore, when a piezo head is used, the conductivity of the ink composition is preferably adjusted to 10 μS/cm or less, so as to obtain an ink which does not cause electrolytic corrosion inside the head. Furthermore, in a continuous type head, it is necessary to adjust the conductivity using an electrolyte, and in this case, it is necessary to adjust the conductivity to 0.5 mS/cm or higher.

In order to improve the stability over time of the polymerizable monomers and inhibit decomposition of the materials, the pH of the ink composition is preferably controlled. The pH is checked by mixing the ink composition with pure water in a weight ratio of 1:1, shaking the mixture thoroughly, and then measuring the pH of the water using an aqueous solution digital pH meter or the like. The pH of the ink composition is preferably in a range of 5 or more but 7.5 or less, and is particularly preferably 5.5 or more but 7 or less.

In order to use the ink composition, the ink composition is first supplied to the printer head of an inkjet recording printer, the ink is then discharged from the printer head onto a substrate, and an active energy beam such as ultraviolet light or an electron beam is then irradiated onto the ink composition. This ensures rapid curing of the ink composition on the printing medium.

In those cases where ultraviolet light is irradiated as the source of the active energy beam, a high pressure mercury lamp, metal halide lamp, low pressure mercury lamp, ultrahigh pressure mercury lamp, ultraviolet laser, LED or solar radiation can be used.

There are no particular restrictions on the printing substrate, and examples include plastic substrates such as polycarbonate, hard polyvinyl chloride, soft polyvinyl chloride, polystyrene, foamed styrol, PMMA, polypropylene, polyethylene and PET, mixtures or modified products of these plastics, paper substrates such as high-quality paper, art paper, coated paper and cast coated paper, as well as glass and metal substrates such as stainless steel.

EXAMPLES

The present invention is described below in further detail using a series of examples and comparative examples, but the aspects of the present invention are in no way limited by these examples. In the following description, the units "parts" represents "parts by weight" in all cases. Further, detailed conditions relating to the following examples and comparative examples are shown below in Table 1, and the results of the examples and comparative examples are shown in Table 2.

(Preparation of Pigment Dispersion A)
Pigment: a carbon black pigment (manufactured by Degussa AG), "Special Black 350" 30.0 parts
Pigment dispersant: Solsperse 32000 (manufactured by The Lubrizol Corporation) 6.0 parts
Monomer: 1,9-nonanediol diacrylate 64.0 parts The above materials were stirred with a high-speed mixer or the like until a uniform mixture was obtained, and the thus obtained mill base was then dispersed for approximately one hour using a horizontal sand mill to complete preparation of a pigment dispersion A.

(Preparation of Pigment Dispersion B)
Pigment: a phthalocyanine pigment (manufactured by Toyo Ink Mfg. Co., Ltd.), "LIONOL BLUE FG-7400G" 15.0 parts
Pigment dispersant: Solsperse 32000 (manufactured by The Lubrizol Corporation) 4.5 parts
Monomer: 1,9-nonanediol diacrylate 80.5 parts In a similar manner to the pigment dispersion A, the above materials were stirred with a high-speed mixer or the like until a uniform mixture was obtained, and the thus obtained mill base was then dispersed for approximately one hour using a horizontal sand mill to complete preparation of a pigment dispersion B.

(Preparation of Pigment Dispersion C)
Pigment: a carbon black pigment (manufactured by Degussa AG), "Special Black 350" 30.0 parts
Pigment dispersant: Solsperse 32000 (manufactured by The Lubrizol Corporation) 6.0 parts
Monomer: dipropylene glycol diacrylate 64.0 parts In a similar manner to the pigment dispersion A, the above materials were stirred with a high-speed mixer or the like until a uniform mixture was obtained, and the thus obtained mill base was then dispersed for approximately one hour using a horizontal sand mill to complete preparation of a pigment dispersion C.

(Preparation of Pigment Dispersion D)
Pigment: a carbon black pigment (manufactured by Degussa AG), "Special Black 350" 30.0 parts
Pigment dispersant: Solsperse 32000 (manufactured by The Lubrizol Corporation) 6.0 parts
Monomer: 2-phenoxyethyl acrylate 64.0 parts In a similar manner to the pigment dispersion A, the above materials were stirred with a high-speed mixer or the like until a uniform mixture was obtained, and the thus obtained mill base was then dispersed for approximately one hour using a horizontal sand mill to complete preparation of a pigment dispersion D.

Example 1

The materials shown in Table 1 were mixed together, with the materials added in sequence under constant stirring, and the mixture was mixed gently until the photopolymerization initiators dissolved. The mixture was then filtered through a membrane filter having a pore size of 1 μm to remove coarse particles and obtain an inkjet ink composition.

Example 2 to Example 33

Inkjet ink compositions were prepared in the same manner as Example 1 in accordance with the formulations shown in Table 1.

Comparative Example 1 to Comparative Example 4

Inkjet ink compositions were prepared in the same manner as Example 1 in accordance with the formulations shown in Table 1.

(Stability Over Time)

A 6 mL sample of each of the ink compositions prepared in the manner described above was placed in a screw top bottle (volume: approximately 7 ml) and sealed, and the viscosity measured after storage for 7 days in an environment at 60° C. was compared with the initial viscosity measured immediately after preparation to evaluate the stability over time. A TVE25L model viscometer manufactured by Toki Sangyo Co., Ltd. was used for measuring the viscosity. Further, the evaluation criteria were as described below, with an evaluation of C or better deemed to indicate good stability over time.

A: a viscosity increase after the storage test of less than 5% compared with the initial viscosity.

B: a viscosity increase after the storage test of at least 5% but less than 10% compared with the initial viscosity.

C: a viscosity increase after the storage test of at least 10% but less than 15% compared with the initial viscosity.

D: a viscosity increase after the storage test of 15% or more compared with the initial viscosity.

[Curability Test]

Using each of the ink compositions prepared in the manner described above, the ink composition was discharged onto a PET plate, using an inkjet discharge apparatus fitted with a piezo head manufactured by Konica Minolta IJ Technologies, Inc., in an amount sufficient to form a film thickness at discharge of 12 μm. Immediately after discharge, the ink composition was irradiated with ultraviolet light using a single metal halide lamp (output: 120 W/cm) manufactured by Harison Toshiba Lighting Corporation, and the maximum conveyor speed at which the printed item was able to be cured by a single pass was investigated. The evaluation criteria for this test were as described below, with an evaluation of C or better deemed to indicate good curability.

A: maximum conveyor speed of 40 m/min or greater.

B: maximum conveyor speed of at least 25 m/min but less than 40 m/min.

C: maximum conveyor speed of at least 10 m/min but less than 25 m/min.

D: curing did not occur even at a conveyor speed of 10 m/min.

(Adhesion Test)

Using each of the ink compositions prepared in the manner described above, the ink composition was discharged onto a PET plate and a polyvinyl chloride plate, using an inkjet discharge apparatus fitted with a piezo head manufactured by Konica Minolta IJ Technologies, Inc., in an amount sufficient to form a film thickness at discharge of 12 μm. Immediately after discharge, the ink composition was irradiated with ultraviolet light by a single pass using a single metal halide lamp (output: 120 W/cm) manufactured by Harison Toshiba Lighting Corporation at a conveyor speed of 10 m/min, thus obtaining a coating film.

Each of these coating films was subjected to an adhesion evaluation under cross-cut conditions. The test was performed by attaching a Cellophane adhesive tape to a portion of the cured coating film that had been cross-cut at intervals of 1 mm into 100 grid squares, rubbing the surface from above with an eraser to ensure satisfactory adhesion of the coating film to the applied surface of the Cellophane adhesive tape, and then peeling the Cellophane adhesive tape away at 90° and evaluating the adhesion based on the degree of adhesion of the coating film to the substrate after peeling. The evaluation criteria were as described below, with an evaluation of C or better deemed to indicate good adhesion.

B: no peeling of any of the 100 grid squares was observed.

C: 1 to 50 of the 100 grid squares peeled away.

D: 50 or more of the 100 grid squares peeled away.

The evaluation results for the ink compositions prepared in Examples 1 to 33 and Comparative Examples 1 to 4 are shown in Table 2.

Examples 1 to 33 are examples containing 2 or more polymerizable monomers each containing 2 or more reactive sites, and a stabilizer (B), and good results were obtained for all the tests of stability over time, curability and adhesion.

Of these examples, Examples 1 to 5, 15, 16 and 19 contain at least one of 2-(2-vinyloxyethoxy)ethyl acrylate, 1,9-nonanediol diacrylate and dipropylene glycol diacrylate as a polymerizable monomer containing 2 or more reactive sites, and also contain the hindered phenol-based compound (B-1), the compound (B-2-1) selected from among phenothiazine-based compounds and hindered amine-based compounds, and the phosphorus-based compound (B-2-2) as the stabilizer (B), and each of these examples exhibited extremely good evaluation results, with evaluations of A for the stability over time and the curability, and an evaluation of B for the adhesion.

In contrast, Example 22 is a system in which the polymerizable monomer (A-1) containing 2 or more reactive sites contains none of 2-(2-vinyloxyethoxy)ethyl acrylate, 1,9-nonanediol diacrylate and dipropylene glycol diacrylate. Although good evaluation results were obtained for each evaluation, the results for the curability and the adhesion to the polyvinyl chloride plate were inferior when compared with those of Examples 1 to 5, 15, 16 and 19. These results indicate that 2-(2-vinyloxyethoxy)ethyl acrylate, 1,9-nonanediol diacrylate and dipropylene glycol diacrylate contribute to improvements in the curability and adhesion.

Examples 15 to 21 are systems having a polymerizable monomer containing 3 or more reactive sites as the polymerizable monomer containing 2 or more reactive sites. Good evaluation results were obtained in each case, with evaluations of B or better for the stability over time and the curability.

Examples 26 to 32 are examples in which the stabilizer (B) is changed for the polymerizable monomer formulation of Example 1. Of these examples, Examples 26 to 28 are systems containing the hindered phenol-based compound (B-1), the compound (B-2-1) selected from among phenothiazine-based compounds and hindered amine-based compounds, and the phosphorus-based compound (B-2-2) as the stabilizer (B), and each of these examples exhibited extremely good evaluation results, with evaluations of A for the stability over time and the curability, and an evaluation of B for the adhesion.

In contrast, Examples 29 and 30 are systems which contain only one of the compound (B-2-1) selected from among phenothiazine-based compounds and hindered amine-based compounds, and the phosphorus-based compound (B-2-2), rather than a combination of the two. The evaluation results revealed that although favorable quality was obtained, the stability over time was evaluated as B, which represents an inferior result compared with those of Examples 26 to 28. Moreover, Examples 31 to 33 are systems which contain either the hindered phenol-based compound (B-1), or the compound (B-2-1) selected from among phenothiazine-based compounds and hindered amine-based compounds, and the phosphorus-based compound (B-2-2) as the stabilizer (B), and although the evaluation results indicated that favorable quality was obtained, the stability over time and the adhesion were evaluated as C, which represents inferior results compared with those of Examples 26 to 28. These results indicate that superior stability over time is obtained only when the stabilizers (B) described above are used in combination.

On the other hand, Comparative Examples 1 to 3 are systems containing only one polymerizable monomer containing 2 or more reactive groups, whereas Comparative Example 4 is a system that does not contain the stabilizer (B), and the evaluation results revealed poor results for the curability and the stability over time respectively.

The above results confirmed that in order to obtain an ink composition having excellent storage stability, curability and adhesion, combining 2 or more polymerizable monomers each containing 2 or more reactive sites, and the stabilizer (B) is an essential requirement.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Pigment dispersion | Pigment dispersion A | 10.0 | 7.5 | 12.0 | 10.0 | | 10.0 | 10.0 | 10.0 | 10.0 | 10.0 |
| | Pigment dispersion B | | | | | 15.0 | | | | | |
| | Pigment dispersion C | | | | | | | | | | |
| | Pigment dispersion D | | | | | | | | | | |
| Polymerizable monomers (A) | | | | | | | | | | | |
| Polymerizable monomer (A-1) containing vinyl ether group and acryloyl group | 2-(2-vinyloxyethoxy)ethyl acrylate | 50.0 | 40.0 | 70.0 | | 45.0 | 40.0 | 50.0 | 75.0 | | |
| Polymerizable monomer (A-2) containing 2 or more acryloyl groups | 1,9-nonanediol diacrylate | 20.0 | 45.0 | 15.0 | 20.0 | 30.0 | | | | 25.0 | |
| | 1,10-decanediol diacrylate | | | | | | | | | 35.0 | 25.0 |
| | Dicyclopentanyl diacrylate | 30.0 | | | 30.0 | 25.0 | 25.0 | | 25.0 | 40.0 | 75.0 |
| | Dipropylene glycol diacrylate | | | | 50.0 | | 35.0 | | | | |
| | Neopentyl glycol-modified trimethylolpropane diacrylate | | 15.0 | | | | | | | | |
| | Ethoxylated bisphenol A diacrylate | | | 15.0 | | | | 30.0 | | | |
| | Trimethylolpropane triacrylate | | | | | | | | | | |
| | Dipentaerythritol hexaacrylate | | | | | | | | | | |
| Monofunctional monomer | 2-phenoxyethyl acrylate | | | | | | | | | | |
| | Vinylcaprolactam | | | | | | | | | | |
| | Lauryl acrylate | | | | | | | | | | |
| Stabilizer (B) | | | | | | | | | | | |
| Hindered phenol-based compound (B-1) | BHT SWANOX | 1.0 | 1.0 | 0.5 | 1.0 | 1.0 | 1.0 | 1.0 | 0.5 | 1.0 | 0.5 |
| | NONFLEX Alba | | | | | | | | | | |
| Compound (B-2) selected from phenothiazine-based, hindered amine-based, and phosphorus-based compounds | Compound (B-2-1) selected from phenothiazine-based and hindered amine-based compounds | Phenothiazine | 0.1 | 0.1 | 0.1 | 0.1 | 0.1 | 0.1 | 0.1 | 0.1 | 0.1 | 0.1 |
| | | HO-TEMPO | | | | | | | | | | |
| | Phosphorus-based compound (B-2-2) | Triphenylphosphine | 0.01 | 0.01 | 0.01 | 0.01 | 0.01 | 0.01 | 0.01 | 0.01 | 0.01 | 0.01 |
| | | IRGAFOS 168 | | | | | | | | | | |
| Photopolymerization initiator | Lucirin TPO | 2.0 | 2.0 | 2.0 | 2.0 | 2.0 | 2.0 | 2.0 | 2.0 | 2.0 | 2.0 |
| | IRGACURE 369 | 3.0 | 3.0 | 3.0 | 3.0 | 3.0 | 3.0 | 3.0 | 3.0 | 3.0 | 3.0 |
| | IRGACURE 819 | 2.0 | 2.0 | 2.0 | 2.0 | 2.0 | 2.0 | 2.0 | 2.0 | 2.0 | 2.0 |
| | KAYACURE BMS | 3.0 | 3.0 | 3.0 | 3.0 | 3.0 | 3.0 | 3.0 | 3.0 | 3.0 | 3.0 |

| | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Pigment dispersion | Pigment dispersion A | 10.0 | 10.0 | 10.0 | 10.0 | 10.0 | | 10.0 | 10.0 | 10.0 | 10.0 |
| | Pigment dispersion B | | | | | | 20.0 | | | | |
| | Pigment dispersion C | | | | | | | | | | |
| | Pigment dispersion D | | | | | | | | | | |
| Polymerizable monomers (A) | | | | | | | | | | | |
| Polymerizable monomer (A-1) containing vinyl ether group and acryloyl group | 2-(2-vinyloxyethoxy)ethyl acrylate | 40.0 | 75.0 | | | 40.0 | 50.0 | 50.0 | 85.0 | | |
| Polymerizable monomer (A-2) containing 2 or more acryloyl groups | 1,9-nonanediol diacrylate | 25.0 | 25.0 | 25.0 | | 40.0 | 25.0 | 20.0 | | 40.0 | 20.0 |
| | 1,10-decanediol diacrylate | 35.0 | | 35.0 | | | | | | | |
| | Dicyclopentanyl diacrylate | | | | 25.0 | | | | | | |

TABLE 1-continued

|  |  | Example 21 | Example 22 | Example 23 | Example 24 | Example 25 | Example 26 | Example 27 | Example 28 | Example 29 | Example 30 |
|---|---|---|---|---|---|---|---|---|---|---|---|
|  | Dipropylene glycol diacrylate |  |  | 40.0 | 75.0 |  |  |  |  | 40.0 | 50.0 |
|  | Neopentyl glycol-modified trimethylolpropane diacrylate |  |  |  |  |  |  |  |  |  |  |
|  | Ethoxylated bisphenol A diacrylate |  |  |  |  | 20.0 | 25.0 |  |  | 20.0 |  |
|  | Trimethylolpropane triacrylate |  |  |  |  |  |  | 30.0 |  |  | 30.0 |
|  | Dipentaerythritol hexaacrylate |  |  |  |  |  |  |  | 15.0 |  |  |
| Monofunctional monomer | 2-phenoxyethyl acrylate |  |  |  |  |  |  |  |  |  |  |
|  | Vinylcaprolactam |  |  |  |  |  |  |  |  |  |  |
|  | Lauryl acrylate |  |  |  |  |  |  |  |  |  |  |
| Stabilizer (B) |  |  |  |  |  |  |  |  |  |  |  |
| Hindered phenol-based compound (B-1) | BHT SWANOX NONFLEX Alba | 1.0 | 0.5 | 1.0 | 0.5 | 1.0 | 1.0 | 1.0 | 0.5 | 1.0 | 1.0 |
| Compound (B-2) selected from phenothiazine-based, hindered amine-based, and phosphorus-based compounds | Compound (B-2-1) selected from phenothiazine-based and hindered amine-based compounds: Phenothiazine HO-TEMPO | 0.1 | 0.1 | 0.1 | 0.1 | 0.1 | 0.1 | 0.1 | 0.1 | 0.1 | 0.1 |
|  | Phosphorus-based compound (B-2-2): Triphenylphosphine IRGAFOS 168 | 0.01 | 0.01 | 0.01 | 0.01 | 0.01 | 0.01 | 0.01 | 0.01 | 0.01 | 0.01 |
| Photopolymerization initiator | Lucirin TPO | 2.0 | 2.0 | 2.0 | 2.0 | 2.0 | 2.0 | 2.0 | 2.0 | 2.0 | 2.0 |
|  | IRGACURE 369 | 3.0 | 3.0 | 3.0 | 3.0 | 3.0 | 3.0 | 3.0 | 3.0 | 3.0 | 3.0 |
|  | IRGACURE 819 | 2.0 | 2.0 | 2.0 | 2.0 | 2.0 | 2.0 | 2.0 | 2.0 | 2.0 | 2.0 |
|  | KAYACURE BMS | 3.0 | 3.0 | 3.0 | 3.0 | 3.0 | 3.0 | 3.0 | 3.0 | 3.0 | 3.0 |

|  |  | Example 21 | Example 22 | Example 23 | Example 24 | Example 25 | Example 26 | Example 27 | Example 28 | Example 29 | Example 30 |
|---|---|---|---|---|---|---|---|---|---|---|---|
| Pigment dispersion | Pigment dispersion A | 10.0 |  | 10.0 | 10.0 |  | 10.0 | 10.0 | 10.0 | 10.0 | 10.0 |
|  | Pigment dispersion B |  | 10.0 |  |  |  |  |  |  |  |  |
|  | Pigment dispersion C |  |  |  |  | 10.0 |  |  |  |  |  |
|  | Pigment dispersion D |  |  |  |  |  |  |  |  |  |  |
| Polymerizable monomers (A) |  |  |  |  |  |  |  |  |  |  |  |
| Polymerizable monomer (A-1) containing vinyl ether group and acryloyl group | 2-(2-vinyloxyethoxy)ethyl acrylate |  |  | 20.0 |  | 30.0 | 50.0 | 50.0 | 50.0 | 50.0 |  |
| Polymerizable monomer (A-2) containing 2 or more acryloyl groups | 1,9-nonanediol diacrylate |  | 25.0 | 40.0 | 40.0 |  | 20.0 | 20.0 | 20.0 | 20.0 | 20.0 |
|  | 1,10-decanediol diacrylate |  | 35.0 |  |  |  |  |  |  |  |  |
|  | Dicyclopentanyl diacrylate |  |  |  | 25.0 |  | 30.0 | 30.0 | 30.0 | 30.0 | 30.0 |
|  | Dipropylene glycol diacrylate | 85.0 |  | 25.0 | 20.0 | 20.0 |  |  |  |  |  |
|  | Neopentyl glycol-modified trimethylolpropane diacrylate |  | 30.0 |  |  |  |  |  |  |  |  |
|  | Ethoxylated bisphenol A diacrylate | 15.0 | 10.0 |  |  |  |  |  |  |  |  |
|  | Trimethylolpropane triacrylate |  |  | 15.0 | 15.0 | 30.0 |  |  |  |  |  |
|  | Dipentaerythritol hexaacrylate |  |  |  |  | 20.0 |  |  |  |  |  |
| Monofunctional monomer | 2-phenoxyethyl acrylate |  |  |  |  |  |  |  |  |  |  |
|  | Vinylcaprolactam |  |  |  |  |  |  |  |  |  |  |
|  | Lauryl acrylate |  |  |  |  |  |  |  |  |  |  |

TABLE 1-continued

| | | Example 31 | Example 32 | Example 33 | Comparative Example 1 | Comparative Example 2 | Comparative Example 3 | Comparative Example 4 |
|---|---|---|---|---|---|---|---|---|
| Stabilizer (B) | | | | | | | | |
| Hindered phenol-based compound (B-1) | BHT SWANOX NONFLEX Alba | 0.5 | 0.5 | 1.0 | 1.0 | | 1.0 | 1.0 |
| Compound (B-2) selected from phenothiazine-based, hindered amine-based, and phosphorus-based compounds | Compound (B-2-1) selected from phenothiazine-based and hindered amine-based compounds | 0.1 | 0.1 | 0.1 | 0.1 | 0.5 0.1 | 0.1 | 0.2 |
| | Phenothiazine HO-TEMPO | | | | | 0.1 | | |
| | Phosphorus-based compound (B-2-2) Triphenylphosphine IRGAFOS 168 | 0.01 | 0.01 | 0.01 | 0.01 | 0.01 | 0.01 | 0.05 |
| Photopolymerization initiator | Lucirin TPO | 2.0 | 2.0 | 2.0 | 2.0 | 2.0 | 2.0 | 2.0 |
| | IRGACURE 369 | 3.0 | 3.0 | 3.0 | 3.0 | 3.0 | 3.0 | 3.0 |
| | IRGACURE 819 | 2.0 | 2.0 | 2.0 | 2.0 | 2.0 | 2.0 | 2.0 |
| | KAYACURE BMS | 3.0 | 3.0 | 3.0 | 3.0 | 3.0 | 3.0 | 3.0 |

| | | Example 31 | Example 32 | Example 33 | Comparative Example 1 | Comparative Example 2 | Comparative Example 3 | Comparative Example 4 |
|---|---|---|---|---|---|---|---|---|
| Pigment dispersion | Pigment dispersion A | 10.0 | 10.0 | 10.0 | | | | |
| | Pigment dispersion B | | | | 10.0 | | | |
| | Pigment dispersion C | | | | | 10.0 | 10.0 | |
| | Pigment dispersion D | | | | | | | 10.0 |
| Polymerizable monomers (A) | | | | | | | | |
| Polymerizable monomer (A-1) containing vinyl ether group and acryloyl group | 2-(2-vinyloxyethoxy)ethyl acrylate | 50.0 | 50.0 | 50.0 | 50.0 | | | 40.0 |
| Polymerizable monomer (A-2) containing 2 or more acryloyl groups | 1,9-nonanediol diacrylate | 20.0 | 20.0 | 20.0 | | 50.0 | | 30.0 |
| | 1,10-decanediol diacrylate | | | | | | | |
| | Dicyclopentanyl diacrylate | 30.0 | 30.0 | 30.0 | | | 50.0 | 30.0 |
| | Dipropylene glycol diacrylate | | | | | | | |
| | Neopentyl glycol-modified trimethylolpropane diacrylate | | | | | | | |
| | Ethoxylated bisphenol A diacrylate | | | | | | | |
| | Trimethylolpropane triacrylate | | | | | | | |
| | Dipentaerythritol hexaacrylate | | | | 30.0 | 30.0 | 30.0 | |
| Monofunctional monomer | 2-phenoxyethyl acrylate | | | | 20.0 | 20.0 | 20.0 | |
| | Vinylcaprolactam | 1.5 | | | 1.0 | 1.0 | 1.0 | |
| | Lauryl acrylate | | 0.3 | | 0.1 | 0.1 | 0.1 | |
| Stabilizer (B) | | | | | | | | |
| Hindered phenol-based compound (B-1) | BHT SWANOX NONFLEX Alba | | | | | | | |
| Compound (B-2) selected from phenothiazine-based, hindered amine-based, and amine-based compounds | Phenothiazine HO-TEMPO | | | | | | | |

TABLE 1-continued

| phosphorus-based compounds | Phosphorus-based compound (B-2-2) | Triphenylphosphine IRGAFOS 168 | | | 0.1 | 0.01 | 0.01 | 0.01 | 0.01 |
|---|---|---|---|---|---|---|---|---|---|
| Photopolymerization initiator | | Lucirin TPO | 2.0 | 2.0 | 2.0 | 2.0 | 2.0 | 2.0 | 2.0 |
| | | IRGACURE 369 | 3.0 | 3.0 | 3.0 | 3.0 | 3.0 | 3.0 | 3.0 |
| | | IRGACURE 819 | 2.0 | 2.0 | 2.0 | 2.0 | 2.0 | 2.0 | 2.0 |
| | | KAYACURE BMS | 3.0 | 3.0 | 3.0 | 3.0 | 3.0 | 3.0 | 3.0 |

Notes)
BHT SWANOX: 2,6-di-t-butyl-4-methylphenol (manufactured by Seiko Chemical Corporation)
NONFLEX Alba: 2,5-di-t-butylhydroquinone (manufactured by Seiko Chemical Corporation)
Phenothiazine: phenothiazine (manufactured by Seiko Chemical Corporation)
HO-TEMPO: 4-hydroxy-2,2,6,6-tetramethylpiperidine-1-oxyl (manufactured by Evonik Degussa GmbH)
Triphenylphosphine: triphenylphosphine (manufactured by Seiko Chemical Corporation)
IRGAFOS 168: tris(2,4-di-tert-butylphenoxy)phosphine (manufactured by BASF Corporation)
Lucirin TPO: 2,4,6-trimethylbenzoyl diphenylphosphine oxide (manufactured by BASF Corporation)
IRGACURE 369: 2-benzyl-2-dimethylamino-1-(4-morpholinophenyl)-butan-1-one (manufactured by BASF Corporation)
IRGACURE 819: bis(2,4,6-trimethylbenzoyl)-phenylphosphine oxide (manufactured by BASF Corporation)
KAYACURE BMS: 4-benzoyl-4'-methyl-diphenyl sulfide (manufactured by Nippon Kayaku Co., Ltd.)

TABLE 2

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Stability over time | | A | A | A | A | A | A | A | B | A | B |
| Curability | | A | A | A | A | A | C | B | B | C | B |
| Adhesion | PET plate | B | B | B | B | B | B | C | B | B | B |
| | Polyvinyl chloride plate | B | B | B | B | B | C | C | C | C | C |

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Stability over time | | A | B | A | B | A | A | A | B | A | A |
| Curability | | C | B | C | B | A | A | B | B | A | B |
| Adhesion | PET plate | B | B | B | B | B | B | C | B | B | C |
| | Polyvinyl chloride plate | C | C | C | C | B | B | C | C | B | C |

|  |  | Example 21 | Example 22 | Example 23 | Example 24 | Example 25 | Example 26 | Example 27 | Example 28 | Example 29 | Example 30 |
|---|---|---|---|---|---|---|---|---|---|---|---|
| Stability over time | | B | B | A | A | A | A | A | A | B | B |
| Curability | | B | C | B | B | C | A | A | A | A | A |
| Adhesion | PET plate | B | C | B | B | B | B | B | B | B | B |
| | Polyvinyl chloride plate | C | C | B | B | B | B | B | B | B | B |

|  |  | Example 31 | Example 32 | Example 33 | Comparative Example 1 | Comparative Example 2 | Comparative Example 3 | Comparative Example 4 |
|---|---|---|---|---|---|---|---|---|
| Stability over time | | C | C | C | B | A | A | D |
| Curability | | A | A | A | D | D | D | A |
| Adhesion | PET plate | C | C | C | * | * | * | B |
| | Polyvinyl chloride plate | C | C | C | * | * | * | B |

Note:
In Comparative Examples 1 to 3, the discharged ink composition did not cure, and therefore the adhesion could not be evaluated.

INDUSTRIAL APPLICABILITY

The active energy beam-curable inkjet ink composition of the present embodiment has low viscosity yet exhibits superior curability and superior adhesion to many different substrates, and also exhibits excellent storage stability, and can therefore be used, for example, in inkjet printing for industrial and commercial applications.

The invention claimed is:

1. An active energy beam-curable inkjet ink composition, comprising:
    a polymerizable monomer (A),
    a stabilizer (B), and
    essentially no water,
    wherein:
    the polymerizable monomer (A) comprises 2 or more polymerizable monomers each comprising 2 or more reactive sites; and
    the stabilizer (B) comprises
        a hindered phenol-based compound (B-1), and
        a compound (B-2) comprising at least one selected from the group consisting of a phenothiazine-based compound, a hindered amine-based compound and a phosphorus-based compound.

2. The inkjet ink composition according to claim 1, wherein the stabilizer (B) comprises
    a hindered phenol-based compound (B-1) and
    a compound (B-2) comprising at least one selected from the group consisting of a phenothiazine-based compound and a phosphorus-based compound.

3. The inkjet ink composition according to claim 1, wherein at least one of the polymerizable monomers comprising 2 or more reactive sites comprises at least one selected from the group consisting of 2-(2-vinyloxyethoxy)ethyl acrylate, 1,9-nonanediol diacrylate, and dipropylene glycol diacrylate.

4. The inkjet ink composition according to claim 1, wherein the compound (B-2) comprises:
    a compound (B-2-1) selected from the group consisting of a phenothiazine-based compound and a hindered amine-based compound, and
    a phosphorus-based compound (B-2-2).

5. The inkjet ink composition according to claim 4, wherein at least one of the polymerizable monomers monomer comprising 2 or more reactive sites comprises at least one selected from the group consisting of 2-(2-vinyloxyethoxy) ethyl acrylate, 1,9-nonanediol diacrylate, and dipropylene glycol diacrylate.

6. The inkjet ink composition according to claim 3, wherein the compound (B-2) comprises:
    a compound (B-2-1) selected from the group consisting of a phenothiazine-based compound and a hindered amine-based compound, and
    a phosphorus-based compound (B-2-2).

* * * * *